United States Patent
Reed et al.

[11] Patent Number: 5,396,405
[45] Date of Patent: Mar. 7, 1995

[54] WIRING CABINET HAVING VERTICALLY ALIGNED PATCH PANELS

[75] Inventors: Steven J. Reed, Cordova; Robert L. Wallgren, Bartlett; Scott T. Davies, Germantown; George R. Wojtan, Germantown; Paul Gazzara, Germantown, all of Tenn.

[73] Assignee: Thomas & Betts Corporation, Memphis, Tenn.

[21] Appl. No.: 131,833

[22] Filed: Oct. 5, 1993

[51] Int. Cl.6 .................................................. H02B 1/20
[52] U.S. Cl. .................................... 361/827; 361/729; 361/752; 361/796; 174/65 R
[58] Field of Search ............... 361/728, 729, 730, 752, 361/788, 796, 799, 802, 803, 810, 823, 825, 826, 827, 833, 837; 211/41, 58; 174/60, 59, 65 R

[56] References Cited

U.S. PATENT DOCUMENTS

| | | | |
|---|---|---|---|
| 4,874,322 | 10/1989 | Dola et al. | 439/210 |
| 5,229,925 | 7/1993 | Spencer et al. | 361/422 |
| 5,277,006 | 1/1994 | Ruster | 52/220 |

OTHER PUBLICATIONS

Anixter Catalog "Modular Data Products", No. Q-8/88, Front and back covers and p. 130, dated 1988.

*Primary Examiner*—Leo P. Picard
*Assistant Examiner*—Young Whang
*Attorney, Agent, or Firm*—Thomas & Betts Corp.

[57] ABSTRACT

A wiring patch panel cabinet accommodates plural termination devices. A cabinet support structure includes spaced apart top and bottom walls and opposed sidewalls. The cabinet support structure secures a plurality of individual patch panels. Each patch panel accommodates termination devices of a given type. The termination devices of one patch panel may be different from the termination devices of another patch panel supported by the cabinet structure. The patch panels are supported by the cabinet in side-by-side vertical orientation to facilitate removal and repair of an individual patch panel without disturbing adjacent patch panels.

10 Claims, 4 Drawing Sheets

WIRING CABINET HAVING VERTICALLY ALIGNED PATCH PANELS

FIELD OF INVENTION

The present invention relates generally to a wiring cabinet for connecting patch and line cords. More particularly, the present invention relates to a wiring cabinet which supports elongate patch panels in vertically oriented side-by-side disposition.

BACKGROUND OF THE INVENTION

When wiring a building so as to permit transmission of data between various work stations or between work stations and a host system, the wiring between such equipment is typically interconnected at a patch panel. Each patch panel may include a plurality of termination devices, each representing either a work station location or a host connection. The patch panel permits interconnection of line cords, which are attached to work stations or the host system. The patch panels themselves may be interconnected by patch cords. The patch cords and line cords may be collectively referred to as patch cables.

Typically, a plurality of patch panels are supported by a patch panel cabinet in a wiring closet where one or more of the cabinets are used to connect various components together using the patch cables to form physical networks. A patch panel would support plural termination devices at a front face thereof along a horizontally extending row with the associated wiring terminated by the termination device extending behind the panel itself. Plural of these panels would be stacked above one another in the cabinet to facilitate the interconnection between various patch panels.

Often, it is necessary to replace one of the patch panels in the cabinet so as to upgrade, change or otherwise conduct maintenance on the devices contained therein. In the normal horizontal orientation of the patch panels, in order to access the patch panel to be changed, it may be necessary to remove adjacent panels to gain access to the patch panel to be changed. Further, when disposing the elongate patch panels in a horizontal disposition, patch cables extending from the front face of the panel have a tendency, due to gravity, to "droop" and to become tangled with other patch cables extending from the patch panels extending above and below the panel. Accessing certain patch cables becomes time consuming and costly. This makes it difficult for the installer to readily make changes in the wiring cabinet.

It is desirable to provide an arrangement of patch panels in a wiring cabinet which would permit the more efficient distribution of such patch cables and the easy removal and reinsertion of patch panels in the cabinet.

SUMMARY OF THE INVENTION

It is an object of the present invention to provide a cabinet for wiring patch panels which provides for connection of patch cables to termination devices on the front face of the panel.

It is a further object of the present invention to provide a cabinet which supports plural patch panels in vertical disposition to permit the easy insertion and removal of individual patch panels.

It is still a further object of the present invention to permit the arrangement of patch panels in a cabinet where the patch panels accommodate termination devices of different types.

In the efficient attainment of these and other objects, the present invention provides a wiring patch panel cabinet for connecting plural patch cables to termination devices. The cabinet includes a support structure having spaced apart top and bottom walls and opposed sidewalls. A plurality of elongate patch panels are supported by the support structure. Each patch panel accommodates termination devices along a longitudinally extending row. The plurality of patch panels are supported by the support structure with one end of each patch panel being secured to the top wall and the other end of the patch panel being supported by the bottom wall. The longitudinally extending rows of termination devices extend in vertical orientation.

As further described by way of the preferred embodiment herein, each patch panel supported in the cabinet may support termination devices of different types such that each cabinet may have mixed components therein.

DETAILED DESCRIPTION OF THE PREFERRED EMBODIMENT

Figure 1:
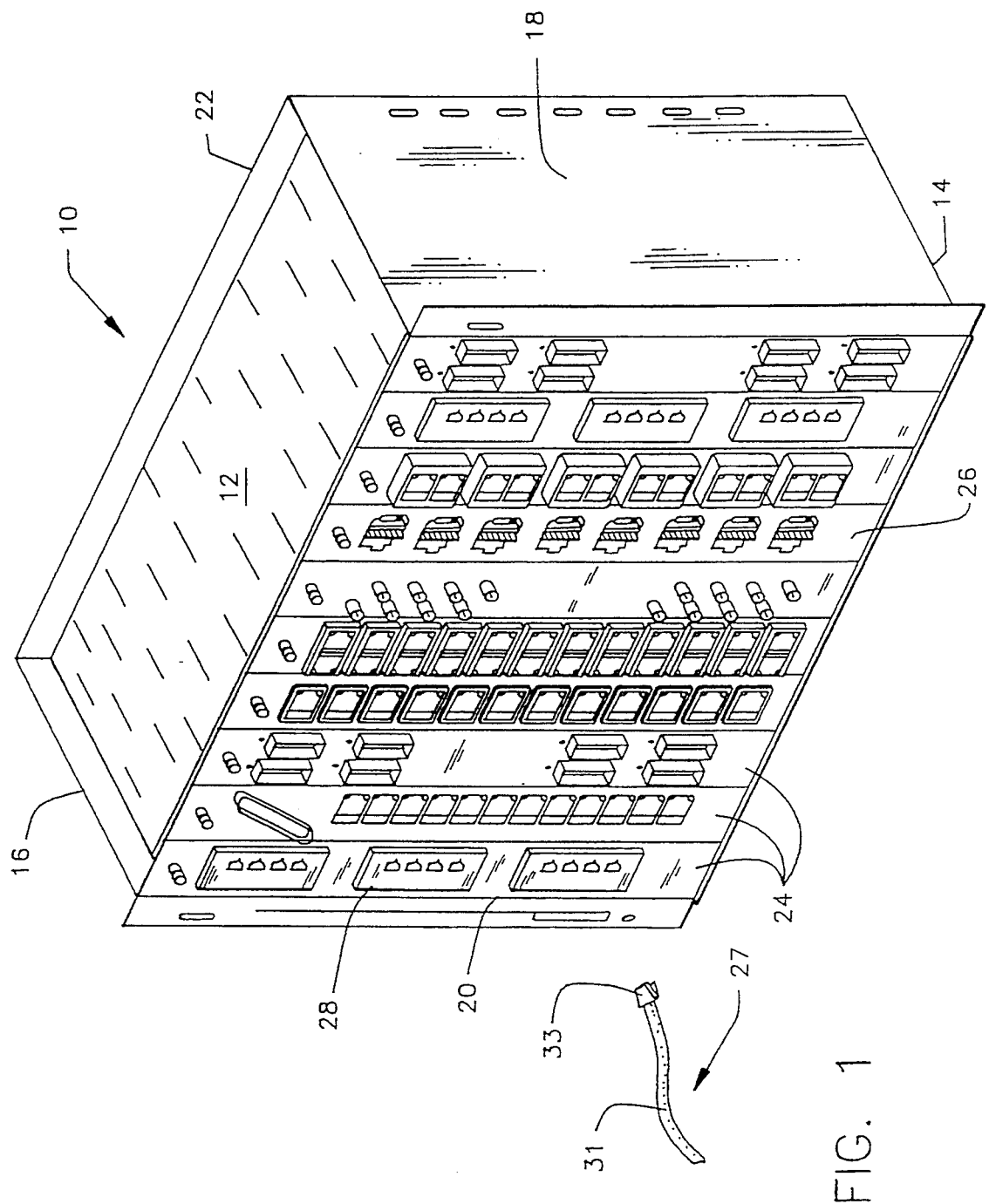
FIG. 1 is a perspective showing of the patch panel cabinet of the present invention.

The patch panel cabinet of the present invention is shown in FIG. 1. Cabinet 10 is generally a hollow rectangular member formed of sheet metal or similar material. Cabinet 10 includes a top wall 12, an opposed bottom wall 14 and spaced apart sidewalls 16 and 18. Opposed front and rear faces 20 and 22 are generally open to permit access to the interior of cabinet 10. Cabinet 10 supports a plurality of patch panels 24 adjacent the front face 20 thereof. Each patch panel 24 is a metallic member having a elongate rectangularly shaped front face 26 on which electrical termination devices 28 such as electrical connectors and the like may be mounted. Each termination device 28 permits patching connection of terminated patch cables 27 which are cables or wires 31 terminated by a connectors 33 which are of mating configuration to the termination device 28 of a given panel 24.

Figure 8:
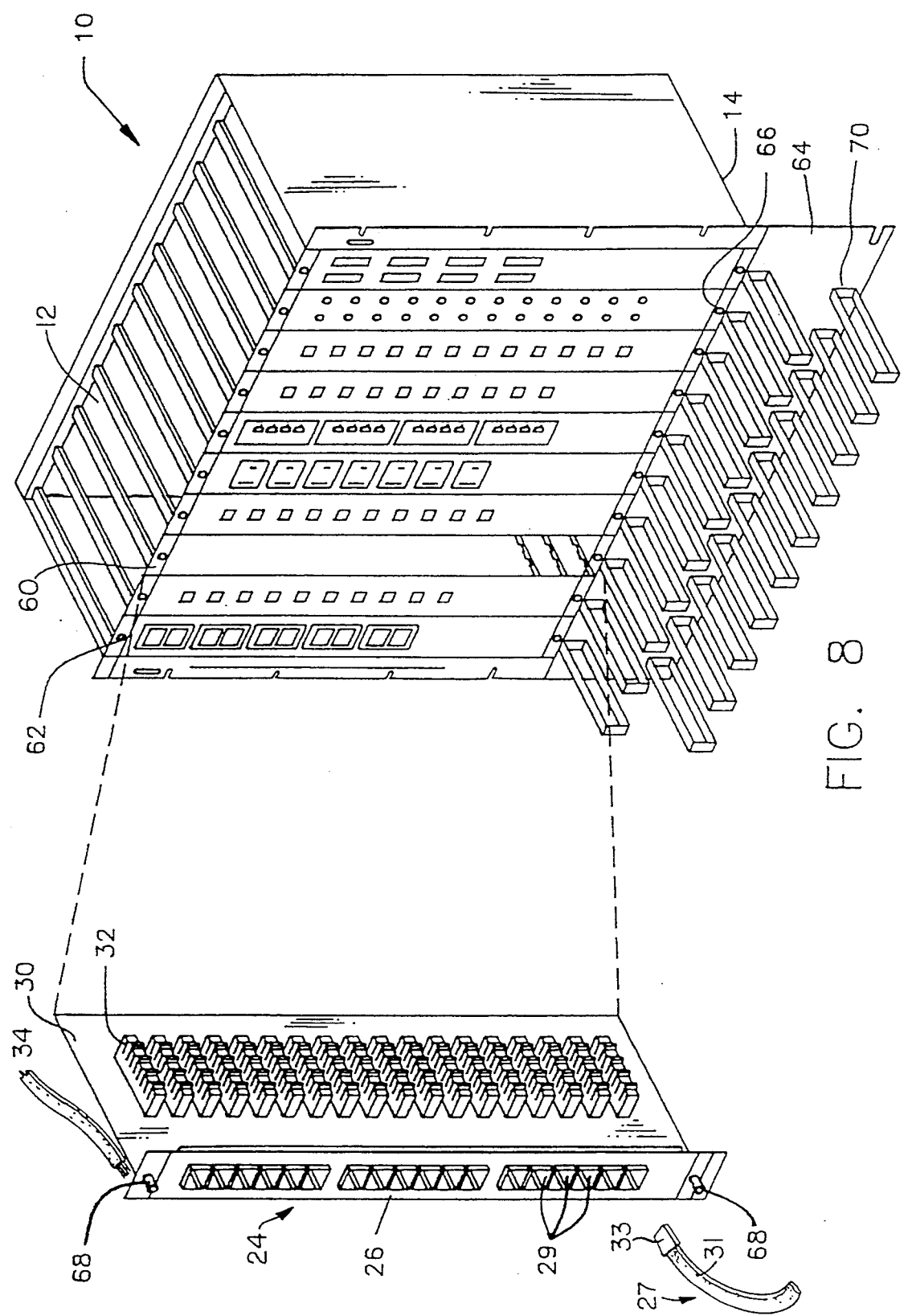
FIG. 8 is an exploded perspective showing of the patch panel cabinet of the type shown in FIG. 1 with an individual patch panel shown removed therefrom.

Referring to FIG. 8 as an example, one type of patch panel 24 is shown removed from cabinet 10. Patch panel 24, shown in FIG. 8, includes a plurality of electrical connectors 29, which may be of conventional RJ jack configuration, mounted in openings in the front face 26 thereof. Patch panel 24 includes a rectangular wire supporting platform 30 extending perpendicularly rearwardly from front face 26. Platform 30 may include wire terminals 32 which terminate electrical wire 34. As is well-known in the art, wires 34 may be terminated to the electrical connectors 29 supported by a patch panel from the rear so that the patch panel may be used to make electrical connections between various components. Connector 33 of patch cable 27 may be of mating RJ plug configuration so as to connect connector 29 at the front face 26 of patch panel 24.

While electrical cable 34 is shown as being of the type which is terminated to electrical connectors 29 of the RJ variety, the present invention also contemplates using patch panels of a variety of configurations. As shown in FIG. 1, termination devices 28 such as OMNI jacks, data connectors, fiber optic connectors of the ST, SC and FDDI variety, as well as many other termination devices which are well-known in the art, may be supported by different patch panels 24 so that a cabinet 10 can support a mixed variety of components. Further, the configuration of the termination devices 28 may be varied for different applications.

Figure 4:
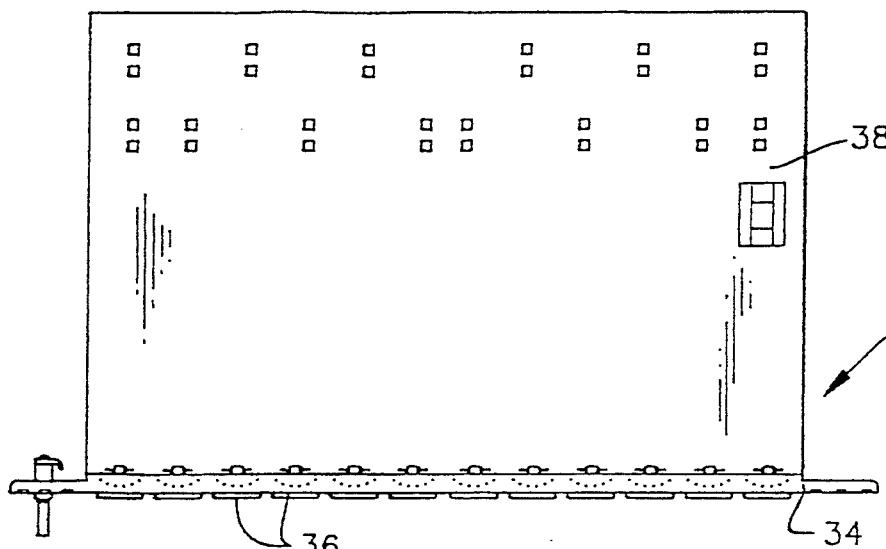
FIGS. 4 and 5 are top plan and front views respectively of another version of the patch panels shown in FIG. 1.
Figure 5:
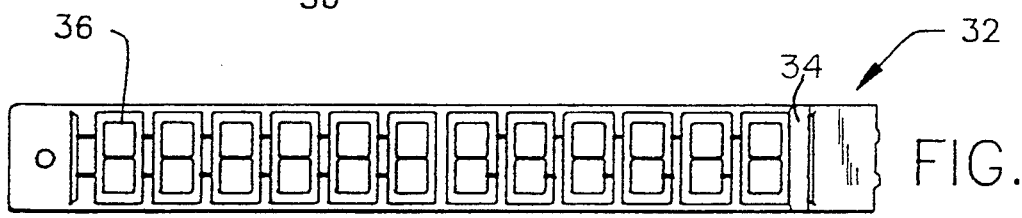

As shown in FIGS. 4 and 5, a patch panel 32 may include a front face 34 supporting pairs of side-by-side jack-type electrical connectors 36 in longitudinally spaced fashion. The rearwardly extending platform 38 would be designed to accommodate and support the wires (not shown) leading to connectors 36. This configuration permits a greater density of connectors in a single panel space.

Figure 6:
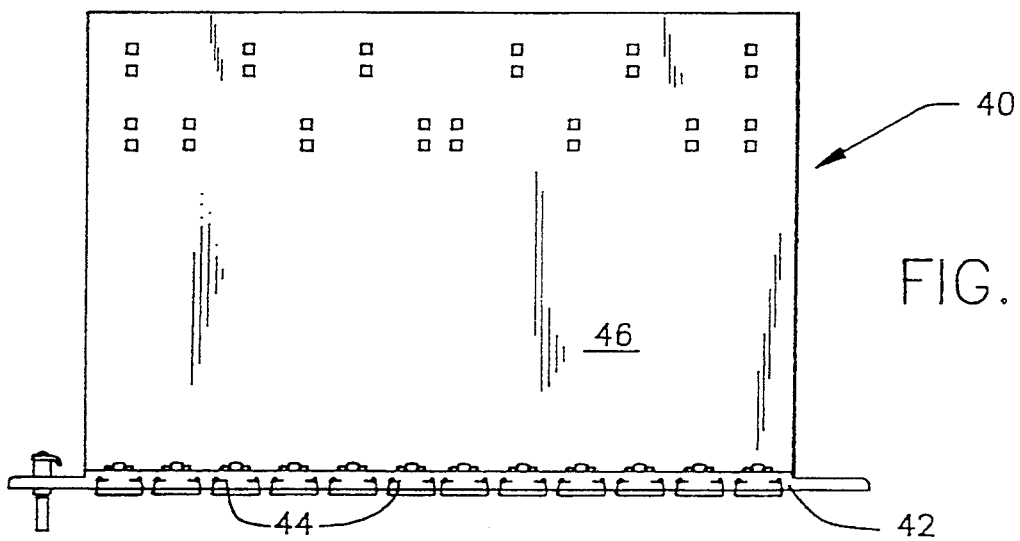
FIGS. 6 and 7 are top plan and front views respectively of a still further version of the patch panel shown in FIG. 1.
Figure 7:
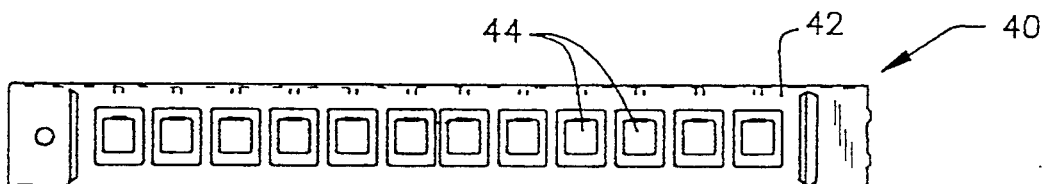

FIGS. 6 and 7 show another configuration of a patch panel. A patch panel 40 is configured to have a front face 42 which supports a plurality of single jack-type electrical connectors 44 along a longitudinal row. A similarly formed platform 46 would be employed to secure electrical wires (not shown) which are terminated by electrical connectors 44.

As mentioned above, the front face 26 of patch panels 24 may be manufactured in a wide variety of configurations so as to connect to many of the numerous configurations of patch cables currently used in the industry. It is further contemplated that the platform 30 (FIG. 8) may also be differently configured depending upon the termination device employed.

Figures 2, 3:
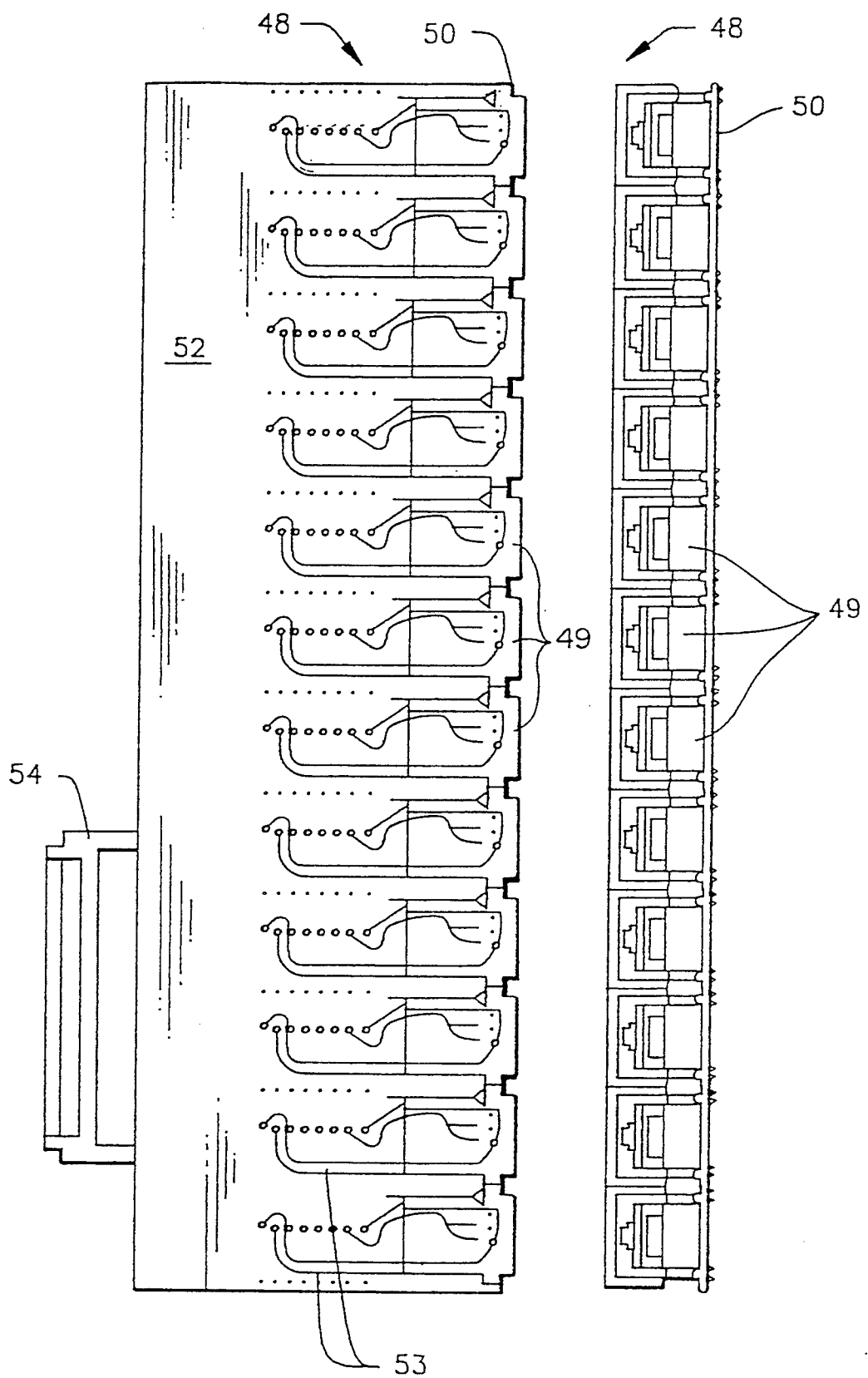
FIGS. 2 and 3 are respectively top plan and front views of a patch panel of the type shown in FIG. 1.

Referring to FIGS. 2 and 3, a patch panel 48 includes electrical connectors 49 of the RJ configuration along a front face 50 thereof. Platform 52 includes a plurality of printed electrical traces 53 which may be used to connect wires (not shown) to the contacts of the RJ type electrical connectors 49. Conventional punch-down terminals (not shown) may be used to connect individual wires. Platform 52 may be further modified to include a mass-termination electrical connector 54 thereon, which is used to attach a multi-conductor electrical cable (not shown) thereto. This permits panel 48 to be used either to connect individual wires or to terminate a single multi-conductor cable.

Referring again to FIGS. 1 and 8, patch panels 24 are supported in cabinet 10 in vertical orientation. Typically, it is known to arrange patch panels in horizontal fashion with adjacent patch panels being stacked above one another. This renders repair and replacement of the patch panels difficult as the patch cables 27 extending from the termination devices 28 at the front faces 26 of patch panels 24 have a tendency to droop under the effects of gravity and become intertwined when so arranged. The present invention, by permitting the vertical mounting of the patch panels 24 in cabinet 10, reduces, if not eliminates, the tendency for the patch cables 27 extending from the front faces 26 to become intertwined. This vertical arrangement where the patch cables of one panel are not above the patch cables of adjacent panels, would prevent the patch cables of one panel from drooping onto the patch cables of the adjacent panel. This facilitates the replacement or repair of an individual patch panel without having to disturb adjacent patch panels.

In order to accommodate patch panels 24 in such vertical orientation. Top wall 12 includes a front mounting surface 60 (FIG. 8) extending along the length thereof. Mounting surface 60 includes a plurality of mounting apertures 62 therealong, which are used to secure patch panels 24 thereto. Similarly, bottom wall 14 includes a front mounting surface 64, which likewise includes a plurality of apertures 66 aligned with apertures 62, also for accommodating patch panels 24. As shown in FIG. 8, patch panel 24 may include upper and lower mounting elements 68 at opposite longitudinal ends thereof. Mounting elements 68 are secured in apertures 62 and 66 to removably support patch panels 24 to cabinet 10. A variety of conventional mounting members may be used such as bayonet spring-loaded screws or conventional nut and bolt assemblies. For simplicity of removal, it is also contemplated that only one end of patch panel 24 need include a securement member while the other end, in combination with the top or bottom wall, could include a tongue-in-groove arrangement to support the opposite end of the patch panel.

Cabinet 10 of the present invention provides for the easy interconnection of electrical connecting components with use of patch cables 27 connected at the front face 20 of cabinet 10. This permits the patching of signals between components remote from the cabinet. As shown in FIG. 8, cabinet 10 of the present invention may also include a facility for mounting a wire harnessing device 70 adjacent the front face 20 thereof to organize and support the patch cables 27 extending from the termination devices 28. It is also contemplated that wire harnessing device 70 may also be vertically oriented in cabinet 10 in side-by-side relationship with patch panels 24.

Various changes to the foregoing described and shown structures would now be evident to those skilled in the art. Accordingly, the particularly disclosed scope of the invention is set forth in the following claims.

We claim:

1. A wiring patch panel cabinet for connecting plural patch cables to termination devices comprising:
    a support structure having spaced apart top and bottom walls and opposed side walls; and
    a plurality of elongate patch panels supported by said support structure, each said patch panel accommodating said termination devices of a given type along a longitudinally extending row, the given type of termination devices of one said patch panel being of a different termination type from said termination devices of another patch panel;
    said plurality of patch panels being supported by said support structure with one end of each said patch panel being secured to said top wall, and said other end of each said patch panel being supported by said bottom wall, said longitudinally extending row of termination devices extending in vertical orientation;
    whereby said patch cables connected to said termination devices of one said patch panel do not become intertwined with said patch cables terminated to said termination devices of an adjacent patch panel.

2. A wiring patch panel cabinet of claim 1 wherein said patch panels are accommodated by said support structure in side-by-side orientation.

3. A wiring patch panel cabinet of claim 2 wherein said patch panel includes a panel face for supporting said termination devices.

4. A wiring patch panel cabinet of claim 3 wherein at least one of said panels includes a panel platform extending perpendicularly from said face for supporting wires terminated to said termination devices.

5. A wiring patch panel cabinet of claim 1 wherein each said patch panel is removably secured to said cabinet for removal therefrom without disturbing the remaining said patch panels in said cabinet.

6. A wiring patch panel cabinet of claim 1 further including securement elements for removably securing said panel one end to said top wall.

7. A wiring cabinet for supporting plural patch cables comprising:
   a cabinet support structure having a top wall and a bottom wall, and
   a plurality of elongate patch panels, each patch panel accommodating said patch cables;
   said plurality of patch panels being supported by said support structure with one end of each said patch panel being secured to said top wall and said other end being supported by said bottom wall, said patch panels extending in vertical orientation;
   whereby said patch cables supported by one said patch panel do not become intertwined with said patch cables supported by an adjacent said patch panel.

8. A wiring cabinet of claim 7 wherein said each patch panel includes means for accommodating plural termination devices.

9. A wiring cabinet of claim 7 wherein one of said patch panels of said plurality includes an elongate front face and a row of side-by-side jack-type electrical connectors supported by said front face, each connector adapted to support one said patch cable.

10. A wiring cabinet of claim 7 wherein one of said patch panels of said plurality includes an elongate front face and a wire mounting platform extending from said front face, said wire mounting platform includes means for electrically and mechanically supporting plural electrical wires and means for electrically and mechanically supporting a single multi-conductor electrical cable.

* * * * *